April 15, 1924.

B. B. MILLER 1,490,621

ELECTRIC HEATER

Filed May 31, 1922   2 Sheets-Sheet 1

Witnesses:

Inventor,
B. B. Miller,
By Clarence A. O'Brien
Attorney.

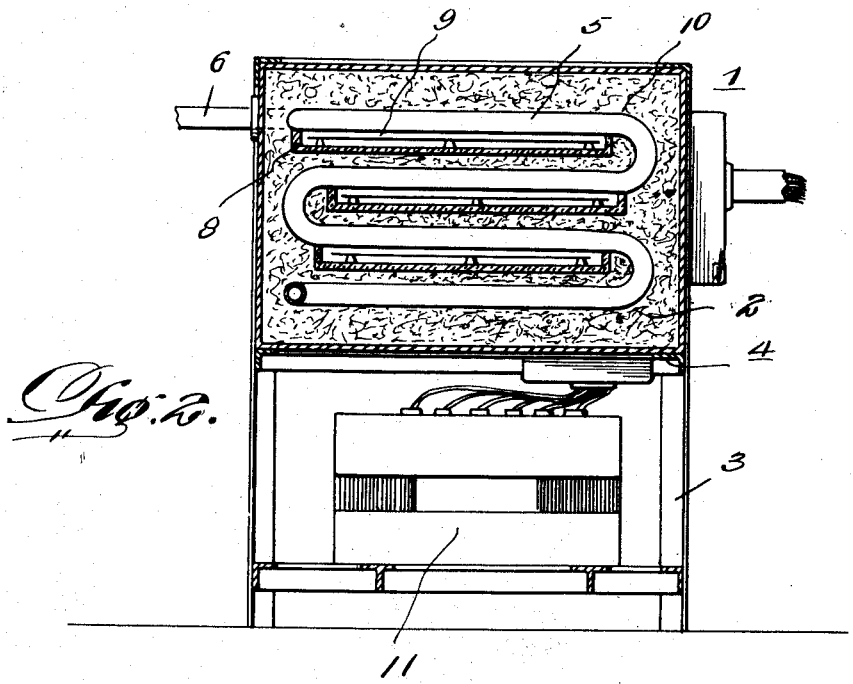
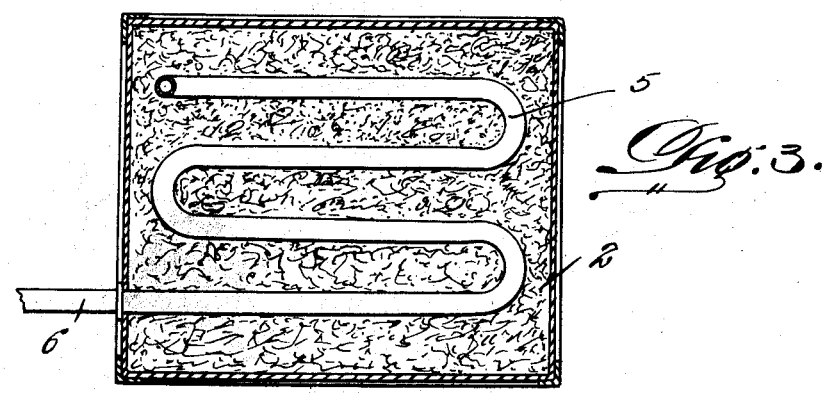

Patented Apr. 15, 1924.

1,490,621

UNITED STATES PATENT OFFICE.

BURTON B. MILLER, OF DETROIT, MICHIGAN.

ELECTRIC HEATER.

Application filed May 31, 1922. Serial No. 564,707.

*To all whom it may concern:*

Be it known that I, BURTON B. MILLER, a citizen of the United States, residing at Detroit, in the county of Wayne and State of Michigan, have invented new and useful Improvements in Electric Heaters, of which the following is a specification.

In carrying out the present invention it is my purpose to provide an electric heater which will be found especially useful for heating water in lieu of gas or other fuel heaters, and wherein the electrical energy supplying the heat may be controlled manually, so that the water may be heated to the desired temperature and maintained at an even and uniform temperature.

It is also my purpose to provide an electric heater wherein the current flowing through the heating elements may be maintained at any desired amperage, so as to insure the proper and uniform heating of the water.

Another object of my invention is to provide an electric heater which will embrace the desired features of efficiency, simplicity and durability, which may be maintained and installed at small cost and which will operate efficiently and economically.

With the above recited objects in view, and others of a like nature, the invention resides in the construction, combination and arrangement of parts set forth in and falling within the scope of the appended claims.

In the accompanying drawings:

Figure 2 is a vertical sectional view through the heater.

Figure 3 is a horizontal sectional view therethrough.

Figure 1:
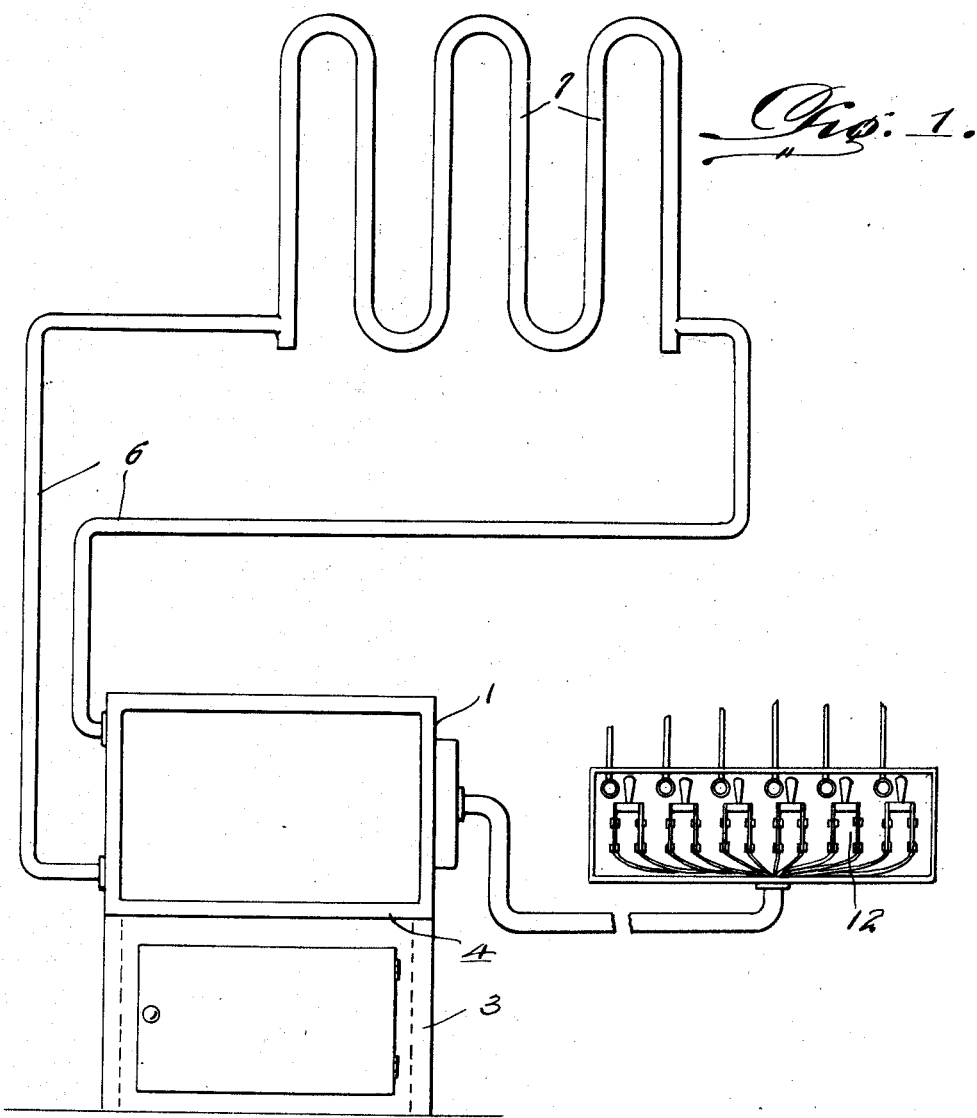
Figure 1 is a diagrammatic view showing a heating plant constructed in accordance with my invention.

Referring now to the drawings in detail, 1 designates a heater comprising an upper compartment 2 and a lower compartment 3 separated from each other by means of a horizontal partition 4.

Arranged within the upper compartment 2 are horizontally disposed heating coils 5 arranged one above the other and connected in series with one another. The heating coils 5 are connected by means of pipe lines 6 with radiating coils 7 by which the heat may be utilized for heating the dwelling or other structure in which my improved heating plant is installed.

Below each set of heating coils 5 in the upper chamber or compartment 2 is a tray 8 and mounted within the tray 8 and spaced apart from the tray and insulated therefrom is a heating element 9 disposed immediately below the adjacent set of coils.

These trays carrying the heating elements are appropriately supported in the upper chamber or compartment and the trays and coils are encased in heat insulating material 10, as clearly shown in Figures 2 and 3 of the drawings, so that the heat will be confined to the coils and prevented from escaping.

Arranged in the lower compartment 3 is a transformer 11 by which the amperage of the current may be stepped up. One side of the transformer 11 is connected with the heating elements 9, while the other side is adapted to be connected to the supply circuit. Also connected to the transformer 11 is a battery of switches 12 that control the amperage of the current flowing through the transformer. These switches are of any suitable or preferred construction and are arranged so that a current of any desired amperage may be delivered to the heating elements.

When starting my improved furnace all of the switches 12 are closed, so that the full current is delivered to the heating elements 9, in order that the water may be heated in the minimum time and after the water has been heated to the desired temperature the switches 12 are manipulated to maintain a current of uniform amperage flowing through the heating coils, thereby holding the water in the circulating system at the desired temperature.

While I have herein shown and described one preferred form of my invention by way of illustration, I wish it to be understood that I do not limit or confine myself to the precise details of construction herein shown and described, as modifications and variations may be made within the scope of the claims and without departing from the spirit of my invention.

Having thus described the invention, what is claimed as new, is:—

1. An electric heater divided into upper and lower compartments, horizontal sets of heating coils within said upper compartment arranged one above another, a tray below each set of heating coils, a heating element on each tray insulated therefrom and disposed in juxtaposition to the under side of the corresponding heating coil, and means for supplying electric energy to said heating elements.

2. In an electric heater, sets of heating coils, a tray below each set of heating coils, a heating element on each tray and insulated therefrom, and means for supplying electric energy to said heating elements.

In testimony whereof I affix my signature.

BURTON B. MILLER.